June 2, 1959
G. ELLIOTT
2,889,537
ELECTRONIC SELECTOR SWITCH
Filed Oct. 28, 1955
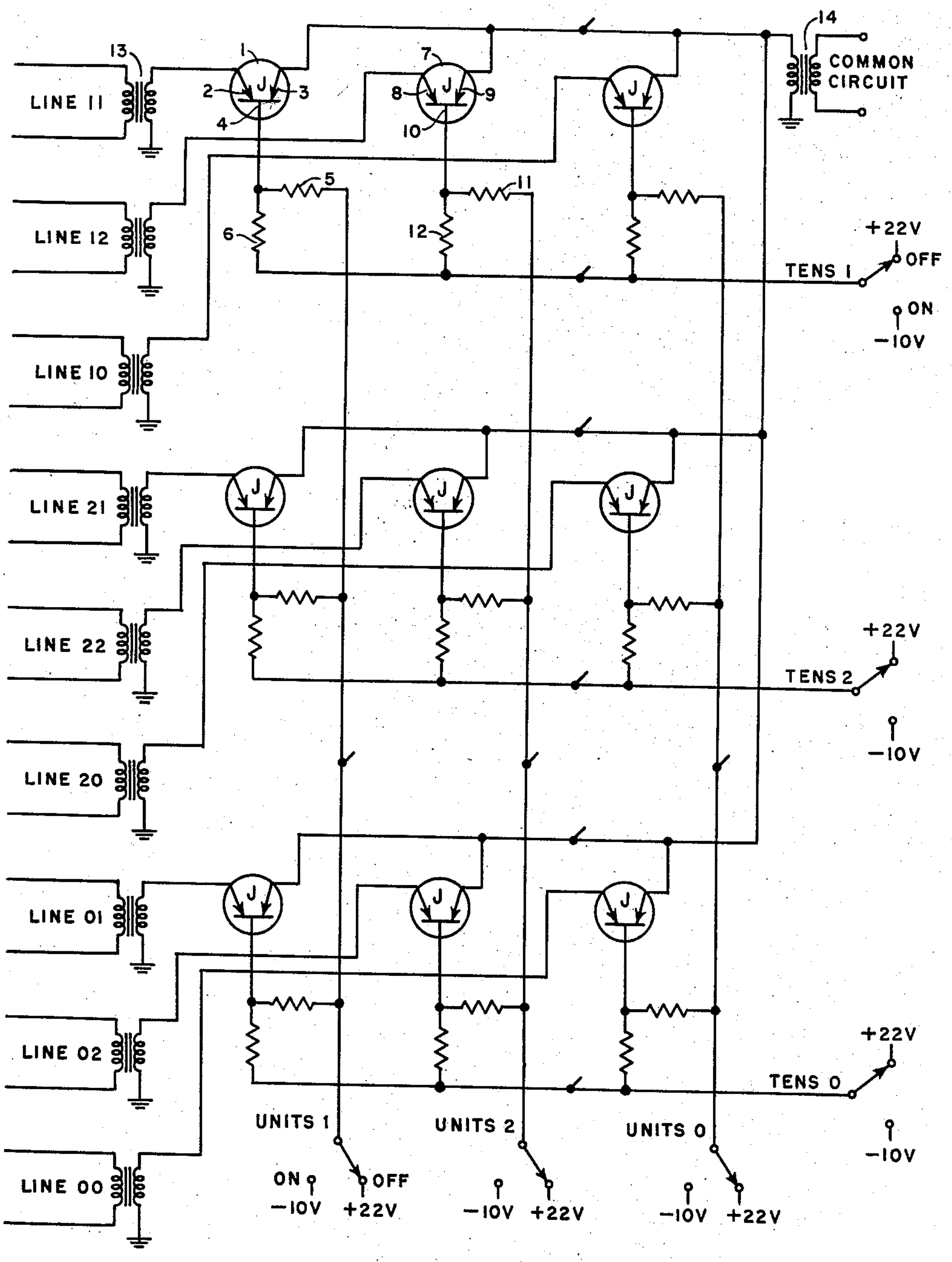
INVENTOR.
GEORGE ELLIOTT
BY F. H. Henson
AGENT United States Patent Office 2,889,537

Patented June 2, 1959

2,889,537

ELECTRONIC SELECTOR SWITCH

George Elliott, Rochester, N.Y., assignor to General Dynamics Corporation, a corporation of Delaware Application October 28, 1955, Serial No. 543,395

8 Claims. (Cl. 340—166)

This invention relates in general to communication systems, and more particularly to electronic selector switches for use in communication systems.

With the advent of electronic telephone and other communication systems, a need has arisen for an inexpensive electronic selector switch capable of switching communication and control signals without undue attenuation or distortion. For example, in the electronic telephone system disclosed in the copending application of Robert B. Trousdale, Serial No. 492,064, filed March 4, 1955, and assigned to the same assignee as the present application, electronic selector switches are utilized to scan the lines of the system for supervisory information, to close the communication circuit between a calling line and a selected called line, to connect a ringing source to the called line, and for many other purposes. In some applications of an electronic selector switch it is necessary that the switching elements of the selector switch be extremely fast in operation. For example, the multiplexer circuit disclosed in the above-identified copending application scans the 100 lines of the system at a frequency of 1,000 c.p.s. The time frame is divided into 100 10-microsecond intervals, each of which is allotted to one of the 100 lines of the system. The multiplexer, which may be considered to be a selector switch, serves to connect the lines one at a time to the common equipment for the purpose of determining the off-hook or on-hook condition of each of the lines.

Prior to the invention of the electronic switch disclosed in the copending application of Robert B. Trousdale and George Elliott, Serial No. 529,230, filed August 18, 1955, and assigned to the same assignee as the present application, crystal diodes were used as the switching elements of electronic selector switches. In some applications where crystal diodes are used as switching elements, the circuitry becomes rather complex because of the biasing requirements of crystal diodes.

Accordingly, it is the general object of this invention to provide a new and improved electronic selector switch.

It is a more particular object of this invention to provide a new and improved electronic selector switch in which the biasing requirements of the individual switching elements are relatively simple.

The present invention accomplishes the above cited objects by providing an electronic selector switch which utilizes the electronic switch disclosed in the above-identified copending application, Serial No. 529,230, as a switching element. The switching element comprises a semi-conductive device which may be a transistor or the like, having first and second junctions serially connected with the circuit to be closed. The semi-conductve device is turned "off" and "on" by the application of suitable potentials to its control electrode.

According to the present invention, the first and second junctions of a semi-conductve device are interposed in an individual series connection between each of a plurality of lines and a circuit common to the lines. The control electrode of each device is connected through impedance elements to two control conductors of a group of control conductors in a combination unique thereto. A first potential is normally applied to each of the control conductors and a second potential is substituted for the first potential applied to two of the control conductors to selectively connect one of the lines to the circuit common to the lines. The first and second potentials have a voltage value such and the impedance elements are so proportioned that the device is rendered non-conductive whenever the first potential is applied to either one or both of the control conductors associated with that device. When the second potential is applied to both of the control conductors associated with a given device, both junctions of that device are biased in the forward direction as emitter junctions in the absence of signals to be transmitted. The instantaneous value of the signal appearing on either the selected line or in the common circuit determines which of the junctions of the selected device functions as an emitter and which of the junctions of the selected device functions as a collector. Since the semi-conductive device functions in a bilateral manner to pass either positive or negative signals in either direction, it is desirable that it exhibit good amplification with either junction acting as the emitter and the opposite junction acting as the collector. Most transistors have this characteristic to a sufficient extent, although better results can be achieved with transistors specially designed to have good forward and reverse characteristics.

Further objects and advantages will become apparent as the description proceeds and features of novelty which characterize the invention will be pointed out in particularity in the claims annexed to and forming a part of this specification.

For a better understanding of the invention, reference may be had to the drawing which shows an electronic selector switch.

Referring to the drawing, it will be noted that PNP junction transistors have been used to illustrate the invention. As is well known in the art NPN junction transistors could be used in the same circuits by merely reversing the polarity of the biasing potentials. The transistors have been given the notation of an arrow superimposed on both the so-called emitter and collector electrodes. This notation signifies that the transistors are bilateral in operation and have good amplification with either junction used as the emitter junction.

The electronic switch has been illustrated as being of the one hundred point type in which any one of the 100 lines, 11 to 00, inclusive, can be selectively connected to the common circuit. The switch has also been illustrated as being controlled on a decimal basis. That is, there are ten groups of ten lines with the tens 1 to tens 0 conductors, inclusive, being utilized to control group selection and the units 1 to units 0 conductors, inclusive, being utilized to control unit selection. It is to be understood that the selector switch can be used to select a line from a group of any number of lines and that the switch can be controlled by the energization of 2 out of 4 control conductors, 2 out of 6 control conductors, or on any other selective basis. Since $$x=\frac{n(n-1)}{2}$$

where $x$=number of switches controlled and $n$=number of control conductors, it will be apparent that 6 switches can be controlled by 4 conductors, 15 switches can be controlled by 6 conductors, or the illustrated 100 lines can be controlled by 15 conductors.

It can be seen that a bilateral transistor is interposed in an individual series connection between each line of the group of lines and the common circuit. For example, transistor 1 is utilized as the switching element for connecting line 11 to the common circuit and transistor 7 is utilized as the switching element for connecting line 12 to the common circuit. Referring to transistor 1, it can be seen that the secondary winding of transformer 13, which terminates line 11, is individually connected to the emitter-collector electrode 2 of transistor 1 while the secondary winding of transformer 14, which terminates the common circuit, is connected to emitter-collector electrode 3 of transistor 1 as well as to the second emitter-collector electrode of all of the other transistors of the selector switch. The control or base electrode of each transistor is connected through impedance elements to a group control conductor and a unit control conductor in a combination unique thereto. For example, base electrode 4 of transistor 1 is connected through resistor 6 to the group control conductor tens 1 and through resistor 5 to the units control conductor units 1, while the base electrode 10 of transistor 7 is connected through resistor 12 to group conductor tens 1 and through resistor 11 to units conductor units 2. Similarly, the base electrodes of the remaining transistors are connected to groups and units conductors in such manner that no two base electrodes are connected to the same two conductors.

Simple mechanical switches have been shown for the purpose of controlling the application of different potentials to the control conductors. It is to be understood that any well known means may be used for this purpose. The means used will be determined somewhat by the application of the selector switch. For example, if the switch is used as a final selector switch to connect a communication path to a selected called line for the duration of a call, the potential applied to the tens and units control conductors may be derived from the individual stages of the tens and units digit registers in a connector circuit of the type disclosed in the above-identified copending application, Serial No. 492,064. If the illustrated selector switch is used as a multiplexer circuit, the potential applied to the tens and units control conductors may be derived directly from the tens and units ring circuits of the type disclosed in the last-mentioned copending application. As disclosed in that application, the pulses applied to the tens conductors straddle ten of the pulses applied to the units conductors. Thus, the first ten pulse time positions of each pulse frame, which are respec- number designations 11, 12—10, are defined by the first tens pulse period of the frame within which the first ten unit pulse periods occur. Similarly, the second group of ten pulse time positions of each pulse frame, which are re- pulse time positions of each pulse frame, which are respectively assigned to the lines of the system having directory number designations 21, 22—20, are defined by the second tens pulse period of the frame within which the second group of unit pulse periods occur, etc.

In the illustrated embodiment, means is provided for applying a first potential of +22 volts to each of the control conductors by the expedient of having each of the mechanical switches operated to its "off" position. With +22 volts applied to each of the control conductors, all of the transistors of the selector switch are biased for non-conduction since their base electrodes are positive with respect to their emitter-collector electrodes. For example, base electrode 4 of transistor 1 is at +22 volt potential while the emitter-collector electrodes 2 and 3 stand at ground potential since the secondary windings of transformers 13 and 14 are returned to ground potential.

With the transistors in the non-conductive condition, a large insertion loss is presented to signals in either direction between each of the lines and the common circuit since a T-type attenuator is formed between the back resistance of the first junction of each transistor, the base circuit resistors, the back resistance of the second junction of each transistor, and the load impedance.

Assume that −10 volt potential is applied to the control conductor tens 1 by operating the mechanical switch associated with the tens 1 conductor to its "on" position and that −10 volts is applied to the control conductor units 1 by operating the mechanical switch associated with the units 1 conductor to its "on" position. Under these conditions, transistor 1 is rendered conductive to close the circuit between line 11 and the common circuit while the remaining transistors of the switch remain non-conductive. It can be seen that both junctions of transistor 1 are biased in the forward direction as emitter junctions, in the absence of signals to be transmitted, when −10 volts is applied to conductors tens 1 and units 1. Base current flows in transistor 1 from ground through the secondary winding of transformer 13, through the junction between electrodes 2 and 4, and through resistors 5 and 6 in parallel to −10 volts, and also from ground through the secondary winding of transformer 14, through the junction between electrodes 3 and 4 of transistor 1, and through resistors 5 and 6 in parallel to −10 volts.

During the half-cycle of an input signal from line 11 which causes electrode 2 of transistor 1 to become positive with respect to ground, the junction between electrodes 2 and 4 acts as an emitter and the signal adds to the base current so that the junction between electrodes 3 and 4 conducts the signal current. During the half-cycle of an input signal from line 11 which causes electrode 2 of transistor 1 to become negative with respect to ground, the junction between electrodes 3 and 4 acts as the emitter. The signal acts to subtract from the controlling base current somewhat and the junction between electrodes 2 and 4 conducts signal current as if it were a saturated collector junction. The negative signal on electrode 2 therefore appears at electrode 3. Positive signals appearing in the common circuit, of course, cause the junction between electrodes 3 and 4 to act as an emitter and negative signals cause the junction between electrodes 2 and 4 to act as an emitter.

The second potential of −10 volts is of high enough potential to provide sufficient base current to insure that the transistor is rendered fully conductive or saturated throughout the entire voltage swing of the signal. It has been found that $$E=e_{max}\left[1+\left(1+\frac{Rb}{R}\right)\left(\frac{1-\alpha}{\alpha}\right)\right]$$

where E corresponds to the second potential of −10 volts, $e_{max}$ is the peak signal voltage, $R_b$ is the base resistance, R is the load resistance, and $\alpha$ is either the forward or reverse, whichever is the lesser, current amplification factor of the transistor.

Since transistors exhibit appreciable current gain with the base taken as the input electrode, the base resistors 5 and 6 may be made very large in comparison to the impedance level of the switch. For example, in one tested model of the switch, resistors 5 and 6 had a value of 20,000 ohms each when the first and second potentials were +22 and −10 volts, respectively, and the transistors used were type 2N44. Thus when the transistor is conducting, the shunting effect of the base resistors is small and the insertion loss of the switch is low as a result.

Next examining the condition of transistor 7, it can be seen that resistor 12 is now returned to −10 volts on conductor tens 1, while resistor 11 is returned to +22 volts on conductor units 2. Since resistors 11 and 12 have the same resistance value, the base electrode 10 of transistor 7 stands at approximately +6 volts. The potential applied to the base electrode under these conditions must be greater than the positive peak signal voltage passed by the switch so that the base of the transmitter remains positive with respect to the potential of the emitter-collector electrodes at all times.

From the above it can be seen that each transistor is rendered conductive to connect its associated line to the common circuit only when −10 volts is applied to both the tens and units conductors to which the base electrode of the transistor is connected. Since −10 volts is applied to only one tens conductor and one units conductor simultaneously and since each transistor is connected to a unique combination of tens and units conductors, only one transistor is conductive at any one time.

While there has been shown and described what is considered at present to be the preferred embodiment of the invention, other modifications will readily occur to those skilled in the art. It is not, therefore, desired that the invention be limited to the specific arrangement shown and described, and it is intended to cover in the appended claims all such modifications as fall within the true spirit and scope of the invention.

What is claimed is:

1. In a communication system, a plurality of lines, a circuit common to said lines, means for returning each of said lines and said circuit to ground potential, a plurality of semi-conductive devices individually associated with said lines, each of said devices having first and second emitter-collector junctions and a control electrode, means for interposing the first and second junctions of each device in a series connection between the lines associated with said device and said circuit, a plurality of control conductors, means for connecting each of said control electrodes through impedance elements to at least two of said conductors in a combination unique thereto, means for selectively applying either a first potential or a second potential to each of said conductors, and means including said impedance elements for biasing said first and second junctions of any one of said devices in the reverse direction as long as said first potential is applied to any one of the conductors associated with said device and for biasing said first and second junctions of any one of said devices in the forward direction in the absence of signals to be transmitted between the line associated with said device and said circuit as long as said second potential is applied to all of the conductors associated with said device, whereby the instantaneous value of the signals to be transmitted determines which of said first and second junctions functions as an emitter and which of said first and second junctions functions as a collector when said second potential is applied to all of the conductors associated with said device.

2. The system of claim 1 in which said devices are junction transistors and said control electrodes are base electrodes.

3. The system of claim 2 in which said impedance elements are resistors.

4. In a communication system, a plurality of lines, each of said lines having a number designation comprising group and unit digits, a circuit common to said lines, a plurality of semi-conductive devices, each of said devices having first and second emitter-collector junctions, and a control electrode, means for interposing the first and second junctions of one of said devices in an individual series connection between each of said lines and said circuit, a group of control conductors individually corresponding to the group digits of said number designations, a group of control conductors individually corresponding to the unit digits of said number designations, means for connecting the control electrode of each device to the group and unit conductors corresponding to the number designation of the line associated with that device, first and second sources of potential, means for connecting said first source of potential to each of said group and units conductors, means for substituting the second source of potential for the first source of potential connected to one of said group conductors, means for substituting said second source of potential for the first source of potential connected to one of said unit conductors, and means for controlling each device such that the device blocks the transmission of signals between its associated line and said circuit so long as said first source of potential is connected to either one or both of its associated group and unit conductors and the device permits the transmission of signals between its associated line and said circuit so long as said second source of potential is connected to both its associated group and unit conductors.

5. The system of claim 4 in which each semi-conductive device is a junction transistor, and the control electrode is a base electrode.

6. In a communication system, a plurality of lines, each of said lines having a number designation comprising group and unit digits, a circuit common to said lines, a plurality of semi-conductive devices individually associated with said lines, each of said devices having first and second emitter-collector junctions and a control electrode, means for interposing the first and second junctions of each device in a series connection between the line associated with said device and said circuit, means for returning each of said lines and said circuit to ground potential, a group of control conductors individually corresponding to the group digits of said number designations, a group of control conductors individually corresponding to the unit digits of said number designations, means for connecting the control electrode of each device through impedance elements to the group and unit conductors corresponding to the number designation of the line associated with that device, means for applying a first potential to each of said group and unit conductors, means for substituting a second potential for the first potential applied to one of said group conductors, means for substituting said second potential for the first potential applied to one of said unit conductors, and means including said impedance elements for biasing said first and second junctions of any one of said devices in the reverse direction as long as said first potential is applied to either one or both of its associated group and unit conductors and for biasing said first and second junctions of any one of said devices in the forward direction in the absence of signals to be transmitted between the line associated with said device and said circuit as long as said second potential is applied to both the group and unit conductors associated with said device, whereby the instantaneous value of the signals to be transmitted determines which of said first and second junctions functions as an emitter and which of said first and second junctions functions as a collector when said second potential is applied to both the group and unit conductors associated with said device.

7. The system of claim 6 in which said devices are junction transistors, and said control electrodes are base electrodes.

8. The system of claim 7 in which said impedance elements are resistors.

References Cited in the file of this patent

UNITED STATES PATENTS

| | | |
|---|---|---|
| 2,627,039 | MacWilliams | Jan. 27, 1953 |
| 2,713,119 | Adler | July 12, 1955 |
| 2,722,649 | Immel et al. | Nov. 1, 1955 |

OTHER REFERENCES

Proceedings of IRE, February 1949, pages 139–147.